Jan. 8, 1952     J. C. MILLER     2,581,965

RATE GYROSCOPE

Filed Sept. 30, 1950

Inventor
JOHN C. MILLER

By George H. Fisher
Attorney

Patented Jan. 8, 1952

2,581,965

UNITED STATES PATENT OFFICE 2,581,965

RATE GYROSCOPE

John C. Miller, Minneapolis, Minn., assignor to Minneapolis-Honeywell Regulator Company, Minneapolis, Minn., a corporation of Delaware Application September 30, 1950, Serial No. 187,725

12 Claims. (Cl. 74—5)

This invention relates to improvements in rate gyroscopes, which improvements are adaptable to rate gyroscopes in general and particularly to the type which is shown in the copending application of Wayne A. Stone, Serial No. 187,722, filed September 30, 1950.

The above named application discloses a rate gyroscope having a movable portion of a rotor mounting structure and a pair of restraining springs so designed and positioned as to be located nearer the spin axis for the rotor than the main body or mass of the rotor. As pointed out in that invention, this design and location of parts permitted a ratio between the moment of inertia of the rotor mass about the spin axis to the moment of inertia to the rotor mass and the movable portion of the rotor mounting structure about the deflection axis to be greater than 1. Such a structure provides for a high resonant frequency in a rate gyroscope and makes it highly adaptable to high performance aircraft.

The present invention provides an improvement in this type of structure in that it eliminates the separate gimbal mounting and restraining spring arrangement and provides for the use of crossed reed pivots to perform the operation of the former structure. Thus, a space saving is affected and a higher spring tension or biasing for the rate gyroscope can be utilized. Further the replacement of the bearing type of pivot with the crossed reed type of pivot eliminates bearing friction and adds to the sensitivity of the gyroscope.

It is therefore an object of this invention to provide a simplified and improved rate gyroscope design in which one of the gimbal mounting structures and the restraining springs of the gyroscope are combined in a single structure in the form of crossed reed pivots.

It is further an object of this invention to provide an improved rate gyroscope design in which a journaling structure for the rotor mass and the gimbal mounting and restraining structure in the form of cross reed pivots are mounted within a cup-shaped rotor mass.

This and other objects of this invention will become apparent from reading in the attached specification together with the drawings wherein.

Figure 1:
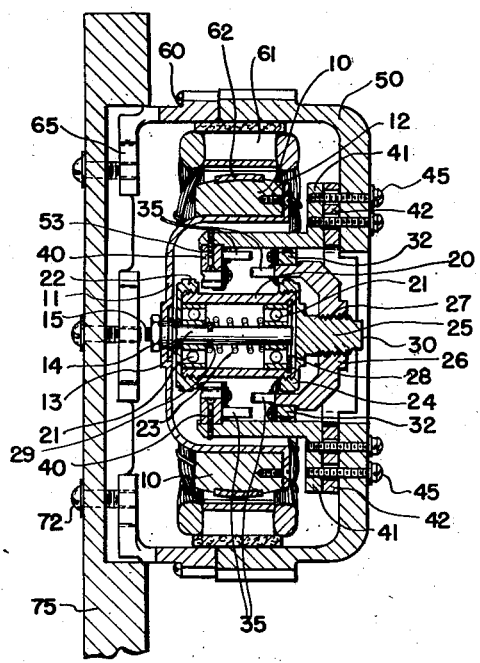
Figure 1 is a vertical sectional view of the gyroscope shown in section.
Figure 2:
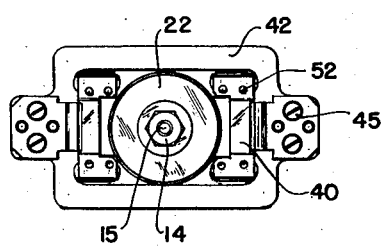
Figure 2 is an end elevation view of a mounting structure for the rotor mass of the gyroscope shown in Figure 1, the view being rotated ninety degrees in a counterclockwise direction from that of Figure 1.
Figure 3:
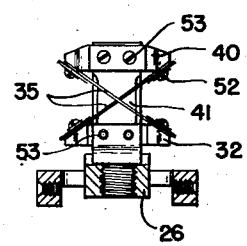
Figure 3 is a top plan view of the mounting structure shown in Figure 2, the view being rotated ninety degrees in a clockwise direction from that of Figure 1.

The rate gyroscope design, as disclosed in Figure 1, utilizes a rotor or mass 10 which is annular or ring-shaped in form having a spherically shaped outer periphery and is mounted on a cup-shaped supporting structure 11, being secured thereto by screws 12 or any other suitable means. The supporting structure 11 is mounted on a shaft 13 concentric therewith, the shaft threading through an aperture in the supporting structure 11 and being secured thereto by a nut 14 mounted on a threaded extremity 15 of the shaft 13 to secure the shaft to the supporting structure. While the rotor 10 and supporting structure 11 together with the shaft 13 has been shown as a plurality of units, it is to be understood that the rotor mass 10 and the support 11 may be integral with one another and may also include the shaft 13 as a machined part integral with the support 11.

Shaft 13 extends into the cup-shaped support structure 11 and therein is mounted within a bearing housing 20 which is generally cylindrical in form and mounts a pair of ball bearing members 21 at either extremity thereof for journaling the shaft 13. The bearing housing also includes a pair of removable cap members 22, 24 at either extremity thereof by means of which the bearings may be removed, inserted or inspected. A spring member 23 is positioned around the shaft between the bearing members 21 which with the aid of stop rings 28, 29, mounted respectively on shaft 13 and housing 20 spaces the bearing members along the shaft. The engagement between the shaft 13 and the bearings 21 of housing 20 journals the shaft within the bearing housing 20 and defines an axis of rotation for the rotor mass 10, known as the spin axis.

Bearing housing 20 including shaft 13 and mass 10 journaled therein is mounted in a U-shaped bracket member 26 through a tapped flange or stud 25 formed integral with the end cap 24 of the bearing housing 20. The tapped stud 25 threads into a threaded aperture 27 in the U-shaped bracket member 26 extending therethrough. A tool receiving end portion 30 on the shaft 25 permits the housing 20 and hence the rotor mass 10 to be accurately located with the U-shaped bracket 26. At the extremities of the U-shaped bracket member 26 are located a pair of flange members 32 to which are attached the extremities of two pairs of crossed reed members 35. Crossed reed members 35 extend along the sides of bearing housing 20 and are attached at their opposite extremities to similar flange members 40 which are mounted at the extremities of a pair of L-shaped bracket members 41. The L-shaped bracket members 41 are in turn attached to an O-shaped bracket member 42 which, as it will be later seen, is a relatively fixed part. A plurality of screws 45 secure the L-shaped bracket members 41 and the O-shaped frame 42 in assembled relationship on a cover member 50. The crossed reed pivots 35 are attached to the mounting flanges 32 and 40 by suitable means such as rivets 52 and the respective flanges are attached to the U-shaped member 26 and L-shaped brackets 41 by screws 53. These crossed reed pivots define a second axis of rotation or pivot between the L-shaped brackets 41 and the U-shaped bracket member 26, this axis being known as the axis of displacement of gyroscope and which is located 90° displaced from the first named or spin axis of the gyroscope defined by the shaft 13 and bearing housing 20. Rotor mass 10 is made spherical to allow for displacement of this mass about these two mutually perpendicular axes. In addition to forming the pivot for the displacement axis of the gyroscope, the cross reeds 35 also bias the movable portion of the rotor mounting structure which includes the U-shaped bracket member 26, shaft or stud 25, and the bearing housing 20 to a position where both of the pairs of crossed reed members 35 are under the same flexing or tension or are straight. When the rotor mass and its associated mounting structure attempts to rotate about the pivots formed by the cross reeds, the reeds themselves bias or restrain the rotor mass and the housing against movement about this deflection axis in a manner well known in rate gyroscope design. Since the pivot function and biasing function of the gyroscope are combined in a single structure, a space saving is effected thereby permitting a larger physical space for the crossed reeds and hence larger crossed reeds. In this manner, stronger reed members may be utilized increasing the biasing on the gyroscope without necessitating an overall increase in the size of the device. In effect, the cross reeds supply a torque about the second axis or deflection axis which acts against the precessive movement of the gyroscope rotor mass when the rotor mass 10 is spinning at a high speed and if the structure upon which the gyroscope as a whole is mounted is displaced with respect to its original position, such as, for example, in the turning of an aircraft. A suitable signal generator or electrical control device (not shown) is generally mounted on the gyroscope of this type to supply a signal in proportion to the displacement of the gyroscope about its restrained axis when the frame upon which the gyroscope is mounted is so displaced. However, since this portion of the gyroscope forms no part of the present invention, details of such structure have been eliminated here for simplicity. However, it is to be understood that a control device such as a potentiometer winding and wiper may be mounted on the O-shaped frame 42 and bearing housing 20 respectively to be operated by relative movement of the rotor mass and frame 32 about the displacement axis defined by the crossed reeds thereby giving a signal output proportional to the rate of displacement of the gyroscope mass.

Enclosing the rotor mass 10 and its associated mounting structure, and mounting the O-shaped frame 42 as indicated above is a cover member 50 which is generally cylindrical in form and is comprised of two parts held together in assembled relationship by means of screws 60. Within the cover member 50 and mounted on the inner periphery thereof by means (not shown) is a field element 61 of an electric motor adapted to spin the rotor mass 10 on its spin axis. The field element 61 is shown as a conventional polyphase induction motor stator and it cooperates with a squirrel cage element 62 (shown in section) which is mounted on the outer periphery of the rotor mass 10 and adjacent the field member 61. The operation of this motor is conventional, the motor windings being so positioned on the field element and so energized by an alternating current that a rotating flux field cooperates with the squirrel cage structure 62 such that the rotor mass 10 is driven at a relatively high speed. Since the cover 50 and hence the field structure 61 are relatively fixed parts of the gyroscope it will be evident that electrical connections to the field element 61 which are not shown in the drawings do not require special connectors running between relatively movable parts of the gyroscope. In this manner axial or flexing contacts are eliminated and direct connections may be made to the field element 61. Cover member 50 of the gyroscope has suitable tapped flanges 65 at the rotor extremity thereof such that the cover member may be mounted on a frame, such as is indicated at 75, by means of screws 72.

The operation of subject gyroscope is generally conventional to the extent that the rotor is rotated at a relatively high rate of speed when its spin motor is energized. The rotor mass 10 is journaled in a housing 20 which itself is pivoted on a relatively fixed part by means of the flexed or crossed reed pivots 35, the pivots restraining movement of the housing 20 and rotor mass 10 about the deflection axis of the gyroscope in a manner well known in rate gyroscopes. Such restraint about the displacement axis of the gyroscope as the gyroscope is precessed operates to produce precessive movement which is proportional to rate of displacement of the gyroscope about the frame 75 upon which it is mounted. This particular arrangement of parts provides for simplicity in structure inasmuch as the crossed reeds 35 take the place of the conventional pivot and separate restraining means. Further, the use of such a structure permits larger biasing members having increased spring rates without increasing the overall size of the gyroscope.

Figure 4:
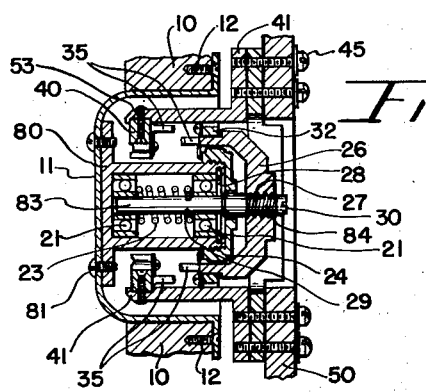
Figure 4 is another embodiment of the subject rate gyroscope shown in section.

The modification of the subject rate gyroscope which is shown in Figure 4 is substantially the same as the preferred embodiment with the exception of the rotor mass 10 is mounted on the cylindrical flange 80 by screws 81 which takes the place of the bearing housing 20 and which houses the bearings 21. The cylindrical flange is in effect a hollow shaft within which is positioned a stationary shaft 83 to cooperate with the bearings 21 in journaling the cup-shaped structure 11 mounting the rotor mass 10. The bearings 21 are similarly positioned on the flange 80 and shaft 83 by means of the spring 23 and stop rings 28 and 29. In this respect the bearings 21 and shaft 83 define the spin axis of rotation of the gyroscope. The stationary shaft 83 extends beyond the cylindrical flange 80 and has a threaded extremity 84 thereof which is mounted in the tapped aperture 27 from the U-shaped mounting bracket 26. As in the preferred embodiment, the U-shaped bracket 26 has flanges 32 at the extremities thereof which mount the cross reed pivots 35, the pivots in turn being attached to flanges 40 mounted on L-shaped bracket members 41. The U-shaped mounting bracket together with the crossed reeds 35 and the shaft 83 provide the movable portion of the mounting structure for the rotor mass and the cylindrical flange member 80. This movable portion is secured through the L-shaped bracket members 41 to the O-shaped frame member and cover 50 in a manner described in connection with Figure 1. The remaining portion of the gyroscope including the field element 61 and squirrel cage element 62 is the same as that described in connection with Figure 1.

In operation, this modification is the same as the preferred embodiment with the exception of the reversal of parts for journaling the rotor mass 10.

In considering this invention it should be kept in mind that the present disclosure is intended to be illustrative only and the scope of the invention is to be determined only by the appended claims.

I claim as my invention:

1. In a device of the class described, a shaft, means mounting said shaft including a first bearing means journaling said shaft and two pairs of crossed reed pivot members pivoting said first bearing means about an axis normal to said shaft, said mounting means being attached to a relatively fixed part, said crossed reed pivot members restraining movement of said shaft about said axis, a cup-shaped mass attached to said shaft and encircling said mounting means, and means for rotating said shaft and said mass mounted in part on said mass and in part on said fixed part, said last named means encircling said mass and said mounting means.

2. In a device of the class described, a shaft, means mounting said shaft including a first bearing means journaling said shaft and crossed reed pivot means pivoting said first bearing means about an axis normal to said shaft, said mounting means being attached to a relatively fixed part, said crossed reed pivot means restraining movement of said shaft about said axis, a cup-shaped mass attached to said shaft and encircling said mounting means, means for rotating said shaft and said mass mounted in part on said mass and in part on said fixed part, said last named means encircling said mass and said mounting means, the center of gravity of said shaft and said mass with its associated mounting means being located within said first named bearing means.

3. In a device of the class described, a rotor mass, means including a shaft and a first bearing means journaling said rotor mass for rotational movement about a first axis and crossed reed pivot means pivoting said first named means and said rotor mass about a second axis normal to said first named axis, said crossed reed pivot means being attached to a relatively fixed part and restraining movement of said rotor mass and said first named means about said second named axis, said rotor mass being cup-shaped in form and encircling said first named means, and means for rotating said rotor mass mounted in part on said mass and in part on said fixed part, said fixed part encircling said mass and said mounting means.

4. In a device of the class described, a rotor mass, means including first bearing means and a shaft for journaling said rotor mass for rotational movement about a first axis, crossed reed pivot means pivotally mounting said rotor mass and said first bearing means about a second axis normal to said first named axis, said crossed reed pivot means being attached to a relatively fixed part and restraining movement of said rotor mass and said mounting means about said second named axis, said rotor mass encircling said first named means and said crossed reed pivot means, and means for rotating said rotor mass mounted in part on said mass and in part on a relatively fixed part, the center of gravity of said rotor mass and associated mounting means being located within said first named bearing means.

5. In a device for determining rate and sense of rotation: a shaft; means including a pair of spaced bearing members journaling said shaft; means including a crossed reed pivot means for pivoting said first named means about an axis normal to said shaft; said crossed reed pivot means restraining movement of said first named means about said axis; a cup-shaped member including an annular mass mounted thereon secured to one end of said shaft and encircling said first and second named means; a frame member mounting said second named means; and motor means including an inductor element and a stator element mounted in part on said annular mass and in part on said frame member and encircling said shaft, and said first and second named means.

6. In a device for determining rate and sense of rotation: a shaft; means including a pair of spaced bearing members journaling said shaft; means including a pivot means for mounting said first named means for limited rotational movement about an axis normal to said shaft, said second named means including a plurality of crossed reed pivots which are adapted to act normal to said axis for restraining movement of said first named means about said axis; a cup-shaped member including an annular mass mounted thereon secured to one end of said shaft and encircling said first and second named means; a frame member mounting said second named means; and a motor means including an inductor element and a stator element mounted in part on said annular mass and in part on said frame member and encircling said shaft and said first and second named means; said device having a center of gravity located at said shaft between said spaced bearing members.

7. In a device for determining rate and sense of rotation: a shaft; means including a pair of spaced bearing members journaling said shaft; means including crossed reed pivot means for pivoting said first named means about an axis normal to said shaft; said crossed reed pivot means restraining movement of said first named means about said axis; a rotor mass including a cup-shaped frame mounted on said shaft and encircling said first and second named means; motor means including an inductor member and a field member for spinning said rotor mass on said shaft; and a cover means enclosing said rotor mass, said first and second named means and mounting said second named means; said field member of said motor being mounted on said cover encircling said rotor mass and said inductor member being mounted on said rotor mass.

8. In a device of the class described, a shaft, means mounting said shaft including a first bearing means journaling said shaft and crossed reed pivot means pivoting said first bearing means about an axis normal to said shaft, said mounting means being attached to a relatively fixed part, said crossed reed pivot means restraining movement of said shaft about said axis, a cup-shaped mass attached to said shaft and encircling said mounting means, and means for spinning said shaft and said mass mounted in part on said mass and in part on said fixed part, said last named means encircling said mass and said mounting means.

9. In a rate gyroscope, a rotor, means journaling said rotor including a shaft, said rotor having a relatively large diametrical dimension to give a large moment of inertia to said rotor with respect to an axis defined by said shaft, mounting means for said rotor and said shaft including a pivot means defining a second axis of rotation normal to said first axis, said pivot means including crossed reed pivot members restraining movement of said rotor and said shaft about said second axis, said mounting means having a smaller diametrical dimension than said rotor such that the moment of inertia of said rotor and said shaft with its mounting means about said second axis is less than said first named moment of inertia.

10. In a rate gyroscope, a rotor, means including a shaft for journaling said rotor, means mounted in part on a relatively fixed part and in part on said rotor for spinning said rotor at a high speed, said rotor having a relatively large diametrical dimension to give a large moment of inertia with respect to an axis defined by said shaft, mounting means for said rotor and said shaft including crossed reed pivot means defining a second axis of rotation normal to said first named axis, said crossed reed pivot means restraining movement of said rotor and said shaft about said second axis and being mounted in part on said relatively fixed part, said mounting means having a smaller diametrical dimension than said rotor such that the moment of inertia of said rotor and said shaft with its associated mounting means about said second axis is less than said first named moment of inertia.

11. In a device of the class described, a rotor mass, means including a shaft for mounting said rotor mass for rotational movement about a first axis, means including crossed reed pivot means pivotally mounting said rotor mass and said first named means about a second axis normal to said first axis, said second named means being attached to a relatively fixed part and biasing said first named means against rotation about said second axis, and electric motor means for rotating said rotor mass about said first axis mounted in part on said relatively fixed part and in part on said rotor mass, said motor means encircling said rotor mass and said first and second named means.

12. In a device of the class described, a rotor mass, means including a shaft for mounting said rotor mass for rotational movement about a first axis, means including crossed reed pivot means pivotally mounting said rotor mass and said first named means about a second axis normal to said first axis, said second named means being attached to a relatively fixed part and biasing said first named means against rotation about said second axis, and motor means for rotating said rotor mass about said first axis, said motor means being mounted in part on said rotor mass and encircling said rotor and mass and said crossed reed pivot means.

JOHN C. MILLER.

REFERENCES CITED

The following references are of record in the file of this patent:

UNITED STATES PATENTS

| Number | Name | Date |
| --- | --- | --- |
| 1,309,636 | Klahn | July 15, 1919 |
| 2,291,612 | Draper | Aug. 4, 1942 |
| 2,378,858 | Mehan | June 19, 1945 |
| 2,517,612 | Varian | Aug. 8, 1950 |

FOREIGN PATENTS

| Number | Country | Date |
| --- | --- | --- |
| 623,943 | Great Britain | May 25, 1949 |